United States Patent
Ryan, Jr. et al.

(10) Patent No.: US 6,192,473 B1
(45) Date of Patent: Feb. 20, 2001

(54) SYSTEM AND METHOD FOR MUTUAL AUTHENTICATION AND SECURE COMMUNICATIONS BETWEEN A POSTAGE SECURITY DEVICE AND A METER SERVER

(75) Inventors: Frederick W. Ryan, Jr., Oxford; Robert W. Sisson, Shelton, both of CT (US)

(73) Assignee: Pitney Bowes Inc., Stamford, CT (US)

( * ) Notice: Under 35 U.S.C. 154(b), the term of this patent shall be extended for 0 days.

(21) Appl. No.: 08/773,472

(22) Filed: Dec. 24, 1996

(51) Int. Cl.$^7$ .............................................. H04L 9/00
(52) U.S. Cl. ...................... 713/168; 713/169; 713/200; 380/44; 380/277; 380/283; 705/64; 705/67; 705/75; 705/76
(58) Field of Search .................. 380/21, 23, 30, 380/24, 43, 44, 45, 49, 277, 283; 395/186, 187.01, 188.01, 200.33, 200.47, 200.48, 200.49, 200.52, 200.57, 200.58, 200.67, 200.8; 902/2, 5, 22, 24, 25, 29; 369/29; 705/64, 67, 75, 76; 713/200, 168, 169

(56) References Cited

U.S. PATENT DOCUMENTS

| | | |
|---|---|---|
| 4,578,530 | 3/1986 | Zeidler . |
| 4,649,233 | 3/1987 | Bass et al. . |
| 4,771,461 * | 9/1988 | Matyas ................................... 380/24 |
| 4,916,738 | 4/1990 | Chandra et al. . |
| 5,048,085 | 9/1991 | Abraham et al. . |
| 5,535,276 * | 7/1996 | Ganesan ................................. 380/25 |
| 5,602,918 * | 2/1997 | Chen et al. ............................ 380/21 |
| 5,745,574 * | 4/1998 | Muftic ................................... 380/23 |
| 5,745,576 * | 4/1998 | Abraham ............................... 380/25 |
| 5,748,735 * | 5/1998 | Ganesan ................................. 380/21 |
| 5,784,463 * | 7/1998 | Chen et al. ............................ 380/21 |
| 5,796,834 * | 8/1998 | Whitney ................................ 380/25 |
| 5,822,739 * | 10/1998 | Kara ..................................... 705/410 |
| 5,825,880 * | 10/1998 | Sudia ................................... 380/21 |

OTHER PUBLICATIONS

Bruce Schneier: "Applied Cryptography", 2nd Ed., pp. 34–55, Oct. 18, 1995, John Wiley & Sons.*

* cited by examiner

*Primary Examiner*—Tod R Swann
*Assistant Examiner*—Paul E. Callahan
(74) *Attorney, Agent, or Firm*—Christopher J. Capelli; Michael E. Melton

(57) ABSTRACT

A method is provided for establishing mutual authentication and secure communications between an microprocessor-based transaction evidencing device and a microprocessor-based server coupled thereto. A session key $K_S$ is generated at the transaction evidencing device and encrypted with a first key $K_1$ to form a first message. The first message is sent to the server and decrypted using a second key $K_2$. In response to the first message a second message is generated at the server and encrypted using the session key $K_S$. The encrypted second message is sent to the transaction evidencing device and decrypted using the session key $K_S$. A response to the second message is generated at the transaction evidencing device and is signed using a third key $K_3$. The signed response is encrypted with the session key $K_S$ and transmitted to the server. The encrypted signed response is decrypted using the session key $K_S$ and the signature is verified using a fourth key $k_4$.

4 Claims, 4 Drawing Sheets

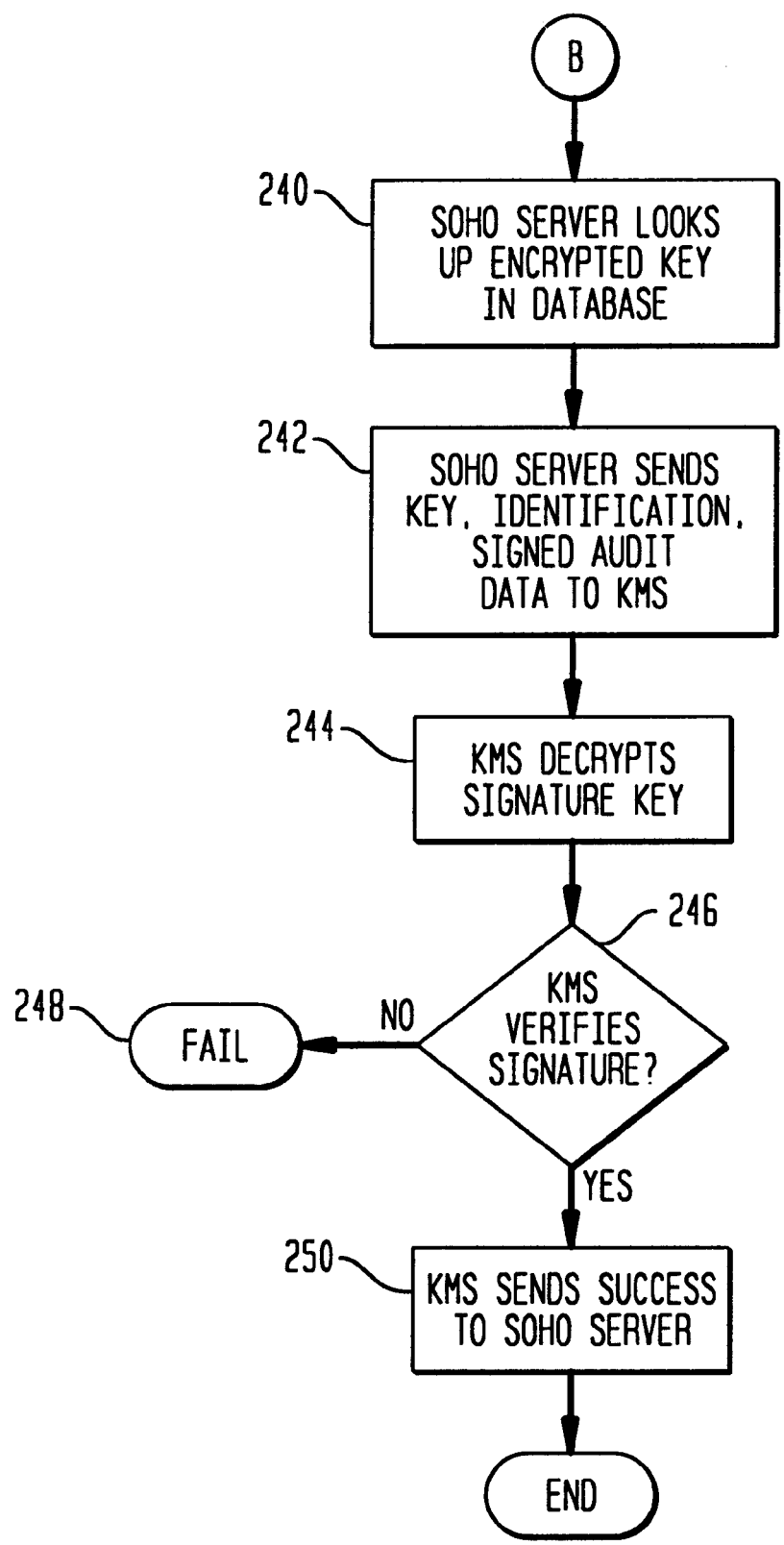

SYSTEM AND METHOD FOR MUTUAL AUTHENTICATION AND SECURE COMMUNICATIONS BETWEEN A POSTAGE SECURITY DEVICE AND A METER SERVER

FIELD OF THE INVENTION

The present invention relates generally to a system and method for communications within a postage evidencing system and, more particularly, to the security of such communications.

BACKGROUND OF THE INVENTION

The Information-Based Indicia Program (IBIP) is a distributed trusted system proposed by the United States Postal Service (USPS). The IBIP is expected to support new methods of applying postage in addition to, and eventually in lieu of, the current approach, which typically relies on a postage meter to mechanically print indicia on mailpieces. The IBIP requires printing large, high density, two dimensional (2-D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

The user infrastructure, which resides at the user's site, comprises a postage security device (PSD) coupled to a host system. The PSD is a secure processor-based accounting device that dispenses and accounts for postal value stored therein. The host system (Host) may be a personal computer (PC) or a meter-based host processor.

It is expected that once the IBIP is launched, the volume of meters will increase significantly when the PC-based meters are introduced. Such volume increase is expected in the small office and home office (SOHO) market.

The IBIP Specifications address and resolve issues which minimize if not eliminate USPS risks regarding security and fraud. However, the IBIP Specifications do not address all of the risks that will be assumed by meter users in the IBIP. There are more risks for meter users in the IBIP than in conventional metering systems because communications between the user infrastructure and the postal and vendor infrastructures contain much more user information than in such conventional metering systems.

Under conventional postage evidencing infrastructure, communications have been point to point, with limited, meter specific information transmitted to and from conventional meters. Under the IBIP, postage metering is evolving in a manner consistent with new communications technology, such as networked computer systems, internet, cellular communications and the like. Under the IBIP, communications between user infrastructure, i.e. the Host and PSD, and the IBIP infrastructure will include user confidential information, such as credit card numbers and addresses. It will be understood that communications over a network, the internet or a cellular system are more susceptible to interception and tampering by an attacker than conventional point to point communications that have heretofore been used with postage metering systems. An attacker could intercept user data as it is transmitted, masquerade as the user or gain sensitive user information. Therefore, the customer is at risk by using such new types of communications.

It is known to perform a mutual authentication of a vendor and user communications for the purpose of protecting vendor and user information. For example, Secure Sockets Layer (SSL), as proposed by Netscape Communications, is a proposed standard for the achieving such authentication. SSL, which is used on the internet and other communication systems, authenticates the vendor/server to the user and optionally the user to the vendor/server. However, SSL requires a trusted third party, such as a certificate authority, to certify the identity of the users and their associated keys.

SUMMARY OF THE INVENTION

The present invention provides a system and method for mutual authentication between the user and vendor which minimizes, if not eliminates, risk to both the vendor and the user, but which does not require a trusted third party. The present invention is suitable for use with non-point-to-point communication systems, such as networked, internet, cellular and the like.

It has been found that the expected volume of new PC-meters will require a new server, referred to herein as a meter server or SOHO server, that will interface with existing postage evidencing infrastructure. The SOHO server will handle all communications between the PC-meters and the infrastructure.

The present invention provides a method to mutually authenticate a meter server, which is also referred to herein as a SOHO server, and a PSD. In addition, through the use of a session key the present invention provides a method of insuring the privacy of data sent between the SOHO server and the PSD. Although such mutual authentication is not required or suggested in the proposed USPS specifications, it has been found that such mutual authentication minimizes the risks of the PC-meter users as well as the USPS.

In accordance with the present invention, the Host creates a unique session key. This session key is encrypted so only the SOHO server, as part of a new IBIP infrastructure, can decrypt it. Once the session key has been established, the PSD will send through the Host a signed audit response to the SOHO server. Once the session key has been established, the session key will be used to encrypt all communications between the two.

The present invention provides a method for establishing mutual authentication and secure communications between an microprocessor-based transaction evidencing device and a microprocessor-based server coupled thereto. A session key $K_S$ is generated at the transaction evidencing device and encrypted with a first key $K_1$ to form a first message. The first message is sent to the server and decrypted using a second key $K_2$. In response to the first message a second message is generated at the server and encrypted using the session key $K_S$. The encrypted second message is sent to the transaction evidencing device and decrypted using the session key $K_S$. A response to the second message is generated at the transaction evidencing device and is signed using a third key $K_3$. The signed response is encrypted with the session key $K_S$ and transmitted to the server. The encrypted signed response is decrypted using the session key $K_S$ and the signature is verified using a fourth key $K_4$.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIGS. 2a–2c are flow charts of the mutual authentication performed in accordance with the present invention.

DETAILED DESCRIPTION OF THE PRESENT INVENTION

Figure 1:
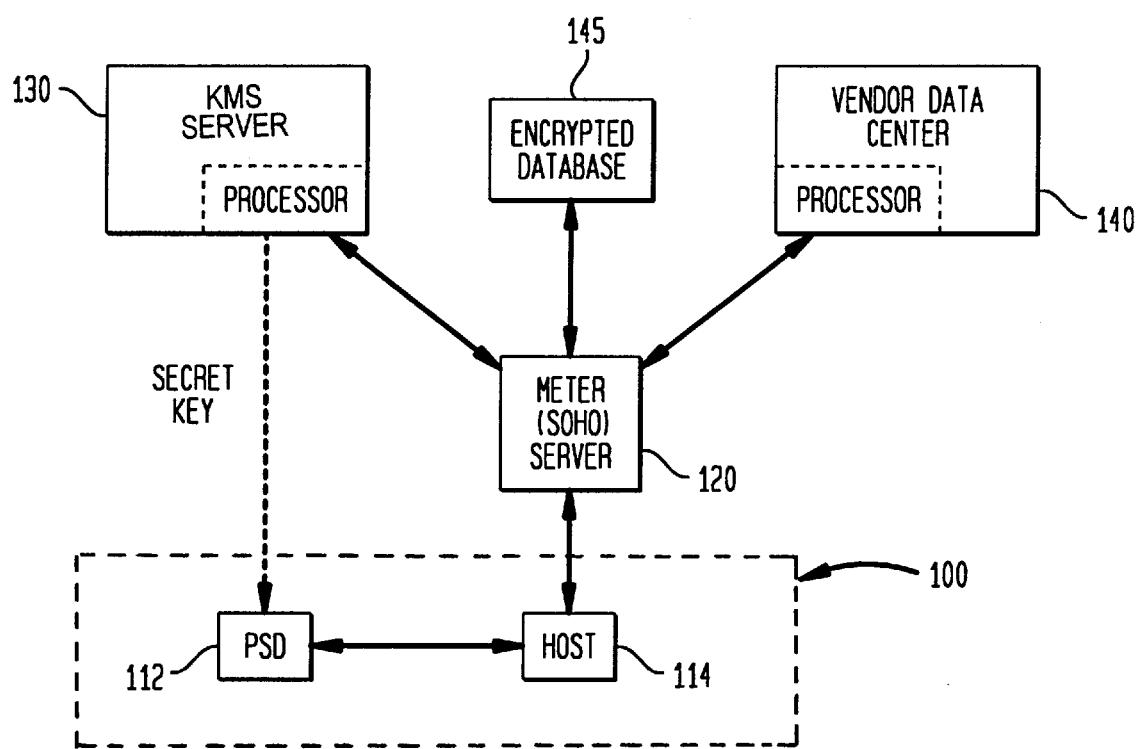
FIG. 1 is a schematic block diagram of a remote meter recharging system in accordance with the present invention.

In describing the present invention, reference is made to the drawings, wherein there is seen in FIG. 1, a schematic block diagram of a postage evidencing system which includes a system and method for mutual authentication in accordance with the present invention is shown. The postage evidencing part of the system, generally designated 100, comprises a postal security device (PSD) 112 coupled to a host system 114, which may be a conventional computer system or a postage meter. The PSD 112 is a secure processor-based accounting device that dispenses and accounts for postal value stored therein. The Host 114 is conventionally connected to a remote Meter Server 120 which establishes on-line connections to several other computer systems, such as a Key Management System (KMS) 130 and a Vendor Data Center 140. The Key Management System 130 securely generates, manages and distributes cryptographic keys and handles obtaining meter certificates. When a new PSD 112 is put in service the Key Management System 130, encrypts a PSD key $K_3$. This encrypted key is sent to the SOHO server 140 where it is stored in an encrypted database 145. The key may later be used to process PSD refills and audits. The key management system 130 makes the necessary keys available to the Meter Server 120 so it can process meter refills and audits.

During manufacturing initialization of a PSD 112 the Key Management System 130 provides a secret key $K_3$ to the PSD 112. The secret key may be unique to the PSD, or, preferably, is a key from a "1000 Key System." as described in U.S. patent application Ser. No. 08/742,526, filed Nov. 1, 1996, and U.S. patent application Ser. No. 08/133,416, filed Oct. 8,1993, both assigned to the assignee of the instant application. The secret key, which is stored in an encrypted format in the KMS database, is loaded from the secure KMS system in a manner similar to that described in U.S. patent application Ser. No. 08/553,812, filed Oct. 23, 1995 and assigned to the assignee of the instant application.

The SOHO Server adds additional functions necessary to allow current data center infrastructure to support PC Meters. Such functions fall into three categories: provide secure, industrial strength connectivity with PC Meter clients to process real time meter related transactions; provide security functions for message encryption, decryption, signature creation and signature verification; and provide processing for the new types of dialogs required to remotely manage PSD's. To achieve these goals the SOHO Server establishes on-line connections to several other computer systems within the current data center infrastructure.

The Key Management System includes a server that distributes keys and handles obtaining meter certificates. This Key Management System server acts as a server and provides a full time, on-line link for communication with the PC Meter Server. When a new meter is put in service the KMS gives the necessary keys to the SOHO Server so it can process meter refills and audits. When a meter is first put in service, moved to a new finance number, or needs to have its certificate renewed the KMS, upon request from the SOHO Server, gets a new certificate from the Certificate Authority and sends it to the SOHO Server where it is stored for subsequent downloading to the PC Meter Host.

Since the SOHO Server 120 is not secure enough to be trusted with secret or private keys, all secret PSD keys are encrypted by the Key Management System 130 with a key $K_{KMS}$ known only the key management system 130 before they are sent to the SOHO Server 120. (Private keys are discarded immediately after downloading to the PSD 112). Separate secure boxes are used by the key management system 130 to secure keys. (See U.S. patent application Ser. No. 08/553,812, previously noted, for a description of such secure boxes.) When the SOHO Server 120 needs to use a key it reads it from the database 145, where it resides in an encrypted form, and sends it to the key management system 130. The key management system 130 decrypts the keys with key $K_{KMS}$ known only to itself, and then uses the key $K_{KMS}$ to perform the requested function. Immediately after performing the requested function, the key $K_{KMS}$ is discarded, i.e., the unencrypted version of the key is erased after it is used but an encrypted version remains in the database 145 for later use. With this approach there will be no private or secret keys in clear form on the SOHO Server 120.

Figure 2A:
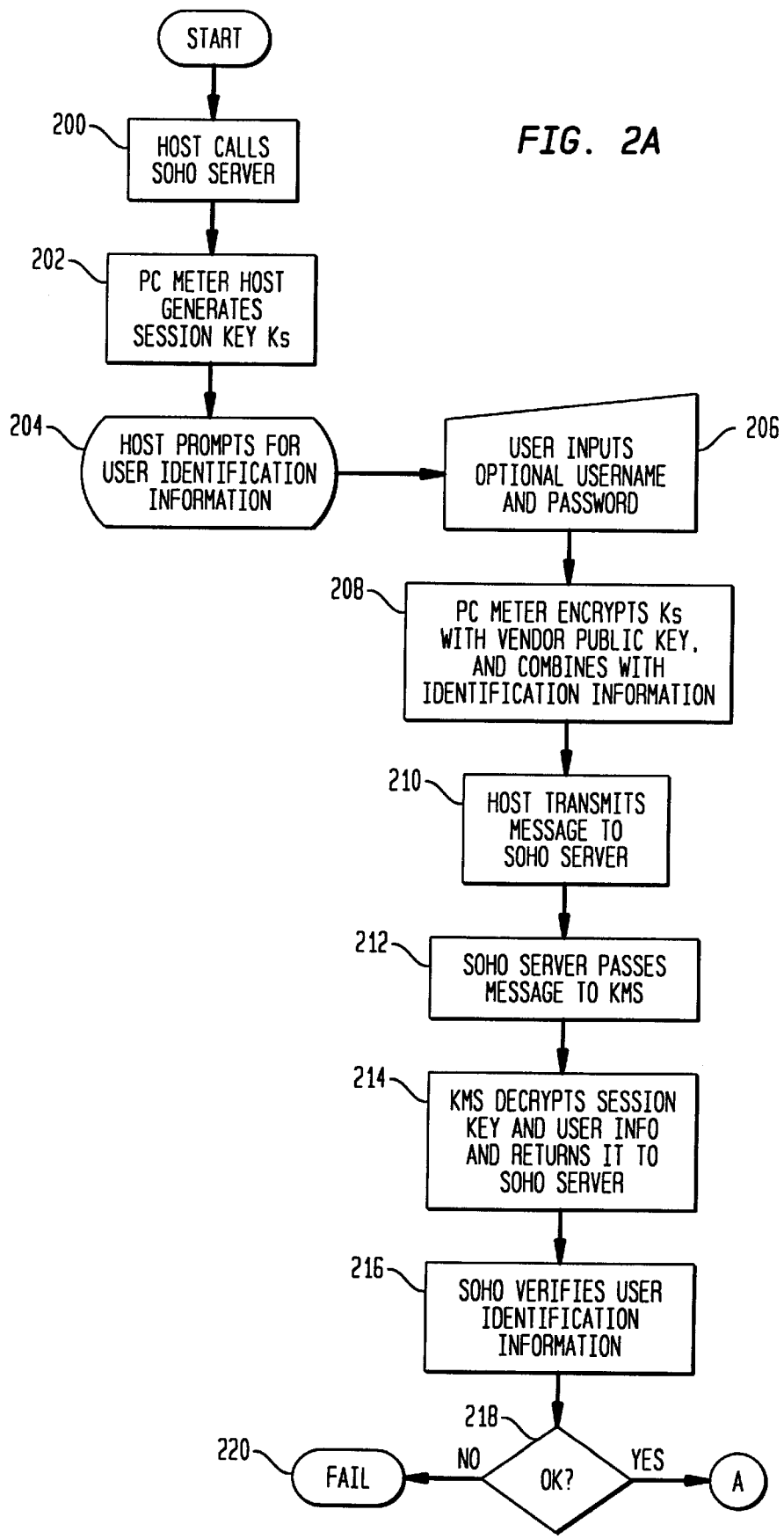
Figure 2B:
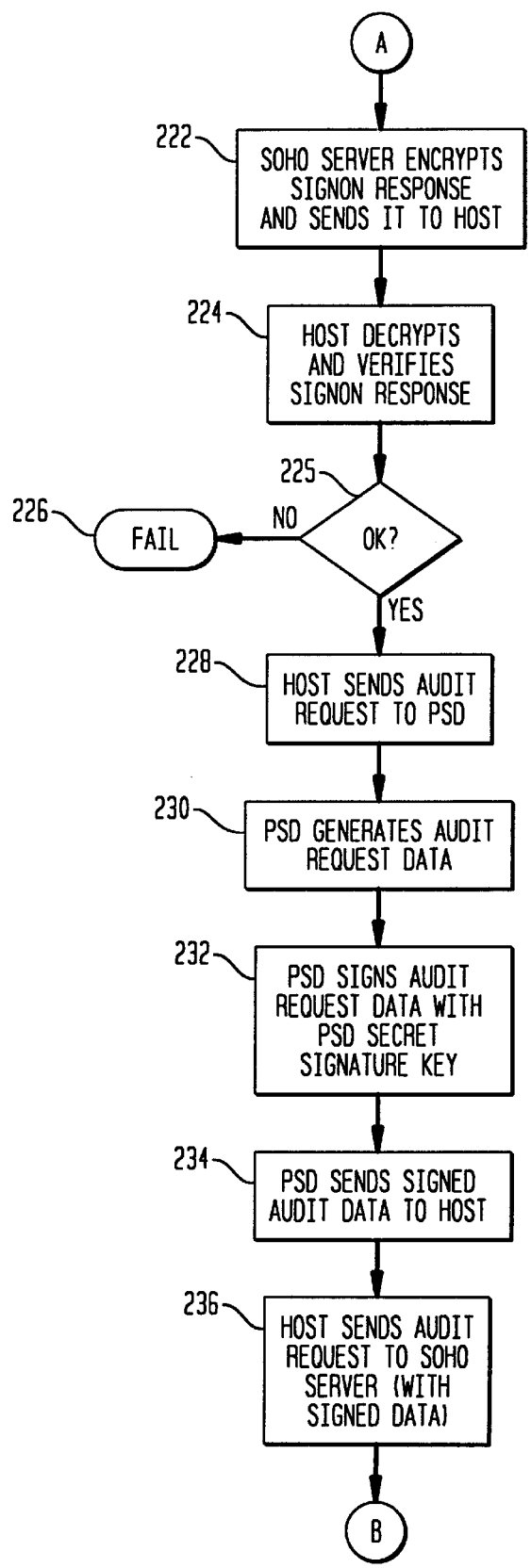

Referring now to FIG. 2a through 2c, the process in accordance with the present invention is described. At step 200, the Host 114, which generates, at step 202, a session key $K_S$ to be used for this session, calls the SOHO server 120. Session key $K_S$ is a secret key, preferably a triple DES key, or a RSA RC2 or RSA RC4 key. In the preferred embodiment, at step 204, the Host 114 prompts the user for user identification information, such as user name and password, which is entered into the Host at step 206. At step 208, the Host 114 encrypts the session key $K_S$ with the vendor's public key, which is preferably stored in the PSD 112, and combines the encrypted session key with the user identification information to form an encrypted message that the Host 114 transmits, at step 210, to the SOHO server 120. It will be understood that, in an alternate embodiment, the vendor public key may be stored in the Host 114. At step 212, the SOHO server 120 transmits the encrypted message to the Key Management System 130 which then, at step 214, decrypts the encrypted message with the vendor's private key and returns the decrypted message and session key $K_S$ to the SOHO server 120. At step 216, the SOHO server 120 verifies the user identification information. If the user information is not verified at step 218, an error signal is sent to the host at step 220. At step 222, the SOHO server 120 encrypts a sign-on response using the session key $K_S$ and transmits it to the Host 114. At step 224, the Host 114 decrypts and verifies the sign-on response using the session key $K_S$. If the message is successfully decrypted, SOHO server 120 is authenticated, i.e., the Host 114 is assured that it is communicating with the expected SOHO server 120. At this point all communications between the SOHO server 120 and the Host 114 are thereafter encrypted using session key $K_S$. If the Host does not verify the sign-on response, an error signal is transmitted to the SOHO server.

At step 228, the Host 114 transmits an Audit Request message to the PSD 112. At step 230, the PSD 112 generates an Audit Response message and signs the Audit Response message, at step 232 using the PSD secret key $K_3$. At step 234, the PSD sends the signed audit response to the Host 114. The Host encrypts the Audit Response message with the session key $K_S$, at step 236, and then transmits the encrypted message to the SOHO server 120. At step 240, the SOHO server 120 decrypts the message with the session key $K_S$ and looks up the encrypted PSD secret key $K_4$ in database 145. At step 242, the SOHO server 120 transmits the key and signed audit data to the key management system 130, along with an encrypted version of the PSD secret key $K_4$ retrieved from the database 145. The key management system 130 then decrypts the encrypted PSD secret key $K_4$, at step 244, and verifies the signature, at step 246, using the key $K_4$. When the signature is verified, the key management system 130 acknowledges signature verification to SOHO server 120. At his point, the SOHO server 120 is assured that it is communicating with the expected PSD 112. If the signature is not verified, an error signal is sent to the SOHO server.

At the successful completion of this process both the PSD and the SOHO server have been authenticated, the user has been authenticated based upon the user identification information, and a session key has been established to protect the privacy of the data (e.g. credit card and address information) sent between the server and the Host.

The present invention has been described for a preferred embodiment relating to PC meters. It will be understood by those skilled in the art that the present invention is also suitable for use transaction evidencing in general, such as for monetary transactions, item transactions and information transactions.

While the present invention has been disclosed and described with reference to a single embodiment thereof, it will be apparent, as noted above, that variations and modifications may be made therein. For example, a single secret key could be used in place of public/private key pairs $K_1/K_2$ and $K_3/K_4$. Furthermore, it will be understood that the present invention is suitable for mutual authentication of any communication system in which it is desired to protect both parties to the communication. It is, thus, intended in the following claims to cover each variation and modification that falls within the true spirit and scope of the present invention.

What is claimed is:

1. An postage evidencing system, comprising:

a PC meter, including a host computer system and a postal security device;

a meter server operatively coupled to the PC meter, wherein said PC meter and said meter server establish a session key for each transaction completed therebetween;

a data center operatively coupled to the postage metering system, said data center performing certain administrative functions following mutual authentication of said PC meter and said meter server;

a database operatively coupled to said meter server, said database having stored therein second and fourth keys corresponding to first and third keys stored in said PC meter, wherein one of said second and fourth keys is used to decrypt messages encrypted by said PC meter using one of said first and third keys, and the other of said second and fourth keys is used to verify signatures of messages that have been signed by said PC meter using the other of said first and third keys wherein said mutual authentication is completed successful decryption of a first message received from said PC meter and successful verification of a signature on a third message received from said PC meter in response to an encrypted second message sent to said PC meter from said meter server.

2. The system of claim 1 wherein said first message includes said session key, said second message is a response to said first message encrypted with said session key, and said third message is an audit response by said postal security device.

3. The system of claim 1 wherein said first key is identical to said second key.

4. The system of claim 1 wherein said third key is identical to said fourth key.

* * * * *